(12) United States Patent
Nishioka et al.

(10) Patent No.: US 6,579,950 B2
(45) Date of Patent: Jun. 17, 2003

(54) RUBBER WASTE DISPOSAL APPARATUS AND METHOD OF TREATING RUBBER WASTE

(75) Inventors: Kazuyuki Nishioka, Kobe (JP); Kiyoshige Muraoka, Kobe (JP); Jun Nishibayashi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/963,442

(22) Filed: Sep. 27, 2001

(65) Prior Publication Data
US 2002/0066814 A1 Jun. 6, 2002

(30) Foreign Application Priority Data
Sep. 28, 2000 (JP) ........................................ 2000-295563

(51) Int. Cl.[7] .................................................. C08F 8/06
(52) U.S. Cl. ...................... 525/388; 241/235; 241/236; 525/332.8; 525/332.4; 525/333.1; 525/333.2; 521/45.5
(58) Field of Search ................................ 241/235, 236; 525/388; 521/45.5

(56) References Cited

U.S. PATENT DOCUMENTS

| | | | |
|---|---|---|---|
| 4,192,471 A | 3/1980 | Beckman et al. | |
| 4,776,525 A | * 10/1988 | Hatanaka | 241/293 |
| 5,411,213 A | 5/1995 | Just | |
| 5,492,657 A | 2/1996 | Danschikov et al. | |
| 5,759,465 A | * 6/1998 | Ha | 241/24.18 |
| 6,015,107 A | 1/2000 | Stegmeier | |

FOREIGN PATENT DOCUMENTS

| | | |
|---|---|---|
| DE | 27 02 177 | 7/1978 |
| EP | 0816035 | 1/1998 |
| EP | 0 816 035 A1 | 1/1998 |
| EP | 1 016 508 A1 | 7/2000 |
| JP | 53-35666 | 9/1978 |
| JP | 54-4487 | 3/1979 |
| JP | U 5-18654 | 3/1993 |
| WO | 9914026 | 3/1999 |

* cited by examiner

Primary Examiner—Bernard Lipman
(74) Attorney, Agent, or Firm—Birch, Stewart, Kolasch & Birch, LLP

(57) ABSTRACT

A rubber waste disposal apparatus processing rubber waste such as an old tire efficiently includes a casing, a rubber waste deformation unit provided in the casing to subject rubber waste to deformation, and an ozone-containing gas supply unit supplying ozone-containing gas into the casing. The rubber waste deformation unit includes a pair of cylindrical rollers having a plurality of protrusions projecting outwards, capable of sandwiching rubber waste at the gap therebetween, and a distance setting unit that can set the distance of the gap between the cylindrical rollers.

18 Claims, 4 Drawing Sheets

RUBBER WASTE DISPOSAL APPARATUS AND METHOD OF TREATING RUBBER WASTE

BACKGROUND OF THE INVENTION

1. Field of the Invention

The present invention relates to rubber waste disposal, particularly to a rubber waste disposal apparatus and method of treating rubber waste such as old tires (including used tires), defective products of manufacturing, rubber waste, and the like.

2. Description of the Background Art

In these few years, the disposal of refuse vulcanized rubber such as old tires (including used tires) has become a major social issue due to the insufficiency of disposal facilities. From the economic standpoint of exhaustion of the resource, it is strongly desired to treat this refuse vulcanized rubber and recover the same as a resource for effective recycling, in converting and collecting refuse vulcanized rubber as a practical substance, the refuse vulcanized rubber is preferably in a comminuted state. The conventional comminuter for refuse vulcanized rubber was mainly based on mechanical method such as shearing, crushing, or impacting on the vulcanized rubber. The vulcanized rubber was pulverized into small particles such as approximately 20–30 meshes, for example. This pulverization process required large motive energy and time since pulverization of the vulcanized rubber by mechanical force was inefficient due to its elastic property. There was a disadvantage that conversion of refuse vulcanized rubber into utility material was extremely costly and not cost-justified.

A method of treating old tires is proposed to comminute vulcanized rubber by applying a mechanical external force on the rubber in a vulcanized state in an atmosphere of a mixture of gases including ozone and air (Japanese Patent Publication Nos. 53-35666, 54-4487, etc.). According to this method of treating old tires, the old tire is removed of the bead portion by a cutter and cut into 16 pieces radially to result in cut pieces. The cut pieces are placed into a sealed container. This sealed container is provided with two plates facing each other so as to repeatedly apply shearing crushing force and agitation. The sealed container has a duct to introduce ozone-containing air therein and a duct to output the exhaust of the air containing ozone from the other side. The cut up pieces are subjected to the chemical process of double bonding in the rubber molecules being broken due to oxidation of rubber caused by ozone and the mechanical stress by an external force simultaneously to be readily comminuted.

Prior to the decomposition of the old tire, the tire must be cut into a plurality of pieces by physical means such as a cutter. This method is complicated with regards to the decomposition means for old tires (including used tires). Also, it is difficult to avoid increasing the running costs associated with the implementation and use of mechanical means for cutting pieces.

In order to facilitate the treatment of rubber waste such as old tires (including used tires) and carry out the treatment of waste disposal at low cost, there is provided a rubber waste disposal apparatus including a sealed tank, an ozone generator to generate ozone in the tank, and a device to apply vibration on the rubber waste placed in the tank (Japanese Utility Model Laying-Open No. 5-18654, and the like). This rubber waste disposal apparatus is provided with a vibration device that applies vibration mechanically or by supersonic waves on the rubber waste in the tank. The rubber waste in the tank is comminuted into powder by filling the tank with ozone and then applying vibration on the rubber waste by means of the vibration device.

However, there were cases where decomposition of the rubber waste was not promoted sufficiently since a vibration device to apply vibration is employed as the mechanical action means on the rubber waste in such a rubber waste disposal apparatus. The treatment of the rubber waste was extremely time-consuming. It was difficult to treat a great amount of rubber waste in a short period of time.

A rubber waste disposal apparatus including a work chamber, a device to supply ozone-containing gas to the work chamber, and a mechanical deformation device for the product that is to be reprocessed is disclosed in WO99/14026 and the like for the purpose of recycling efficiently refuse rubber waste. The deformation device of the rubber waste disposal apparatus is formed of at least two members, one of which is attached so as to be movable with respect to the other member. The rubber waste disposal apparatus is attached with a protruding tool provided so as to engage with the product to be recycled. Specifically, this rubber waste disposal apparatus shown in FIG. 5 includes a chamber 52 where a used tire 51 is to be reprocessed. Two deformation device members 53 and 54 connected to motive energy drivers 55 and 56 are provided in chamber 52. Protruding tools 57 and 58 are attached to deformation device members 53 and 54. Although not shown, a system supplying ozone-containing gas into the chamber is also provided. Used tire 51 is set between the two deformation device members 53 and 54. One of the deformation device members in chamber 52 is driven by the motive energy driver towards the second deformation device member, whereby used tire 51 is subjected to compression deformation. Then, one of deformation device members 53 and 54 exhibits a twisting motion, whereby used tire 51 is subjected to compression and twisting strain.

When the size of the used tire to be processed is altered, this rubber waste disposal apparatus must have the deformation device members exchanged according to the size of the used tire every time the size changes. There are now various sizes of tires corresponding to the variety of needs of the consumer. It is expected that there will be more used tires of different sizes. Exchanging the deformation device members corresponding to the size of the used tire to be processed every time will degrade the efficiency of processing used tires, leading to an increase in the running cost of the process. Furthermore, effective processing of the used tires will be impeded by the requirement of preparing a plurality of deformation device members corresponding to various sizes.

SUMMARY OF THE INVENTION

In view of the foregoing, an object of the present invention is to provide a rubber waste disposal apparatus and method of treating rubber waste to process rubber waste such as old tires (including used tires) efficiently. Here, rubber waste is intended to include used products of various rubber goods, waste from plants, defective products from the fabrication plants, brand new rubber products no longer required, and the like.

According to an aspect of the present invention, a rubber waste disposal apparatus includes a casing, a rubber waste deformation unit provided in the casing to subject the rubber waste to deformation, and an ozone-containing gas supply unit supplying ozone-containing gas into the casing. The rubber waste deformation unit includes at least a pair of cylindrical rollers having a plurality of protrusions projecting outwards, capable of sandwiching rubber waste at the gap therebetween, and a distance setting unit that can set the distance of the gap between the cylindrical rollers.

The gap distance between the cylindrical rollers in the rubber waste disposal apparatus is preferably 5–60% the width of the rubber waste. The ozone-containing gas is preferably a mixture of ozone, air and moisture.

The rubber waste deformation unit preferably includes a rotational speed control unit controlling the rotational speed of the pair of cylindrical roller. The rotational speed of the pair of cylindrical rollers is desirably at least 0.1 rpm.

The rubber waste deformation unit preferably includes a rotation direction control unit controlling the direction of rotation of the pair of cylindrical rollers. The rotation of the pair of cylindrical rollers can be set to one direction during decomposition of the rubber waste.

In the present invention, the ozone concentration of the ozone-containing gas is desirably at least 10 wt %.

In the rubber waste disposal apparatus of the present invention, the ozone-containing gas supply unit preferably supplies ozone-containing gas of high concentration uniformly all over the region of the rubber waste under load of stress between the cylindrical rollers from above and below or from left and right through a plurality of pipes having a plurality of holes, provided vertically or horizontally in close proximity to the pair of cylindrical rollers, whereby reaction with the rubber waste is readily and promptly carried out efficiently under the atmosphere of gas containing ozone of high concentration.

According to another aspect of the present invention, a method of treating rubber waste includes the step of supplying, in an ozone gas atmosphere, rubber waste in a casing including a rubber waste deformation unit with a pair of cylindrical rollers having a plurality of protrusions projecting outwards, capable of sandwiching the rubber waste at the gap therebetween, and adjusting the distance of the gap between the cylindrical rollers to decompose the rubber waste effectively.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4A and 4B show a cylindrical roller employed in the rubber waste disposal apparatus of the present invention, wherein FIG. 4A is a front view from the axial direction and FIG. 4B is a side view from a direction perpendicular to the shaft.

DESCRIPTION OF THE PREFERRED EMBODIMENT

Figure 1:
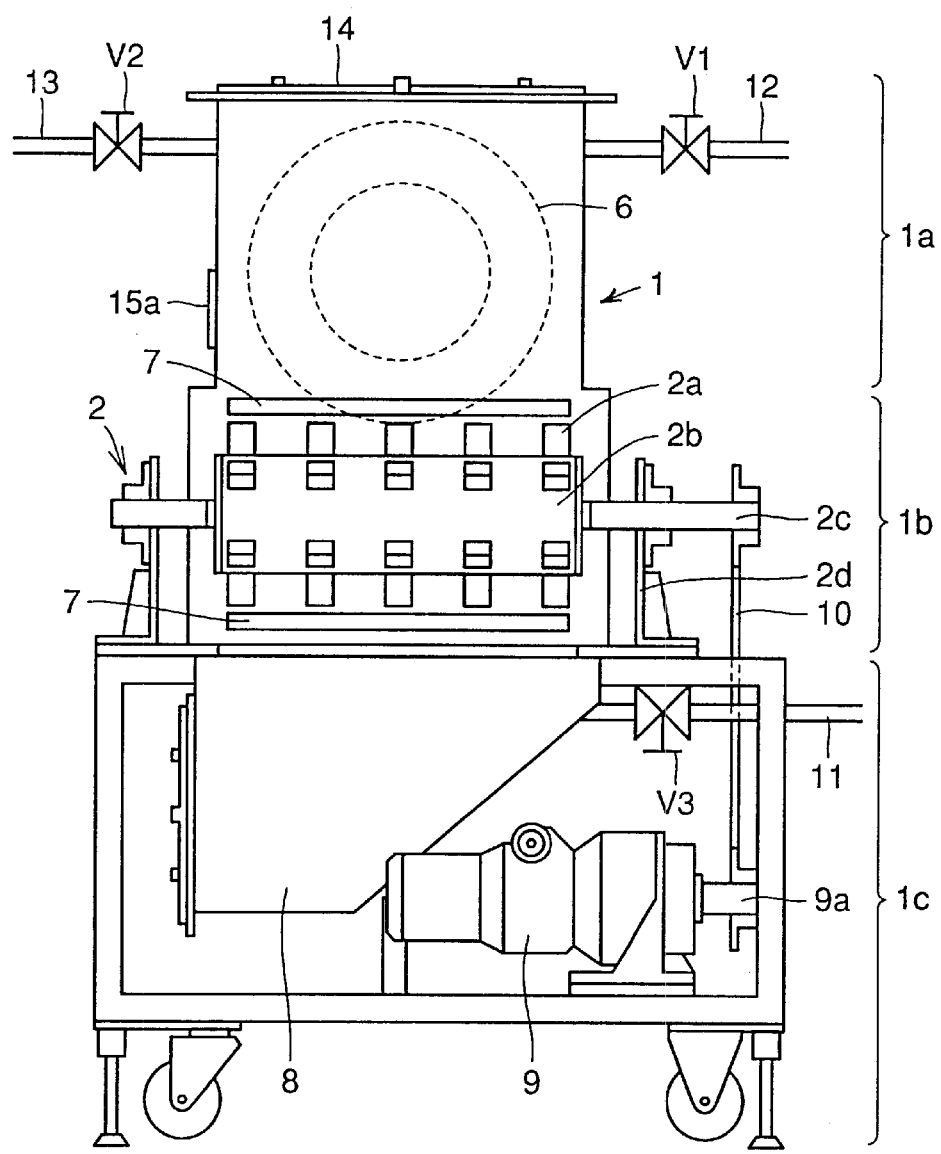
FIG. 1 is a front view of a rubber waste disposal apparatus of the present invention.

A rubber waste disposal apparatus of the present invention includes a casing, a rubber waste deformation unit, and an ozone-containing gas supply unit supplying ozone-containing gas into the casing. The rubber waste deformation unit is provided in the casing to subject rubber waste to deformation. Deformation of the rubber waste is effected by a pair of cylindrical rollers provided at the rubber waste deformation unit. The pair of cylindrical rollers have a plurality of protrusions projecting outwards to sandwich rubber waste at the gap therebetween. The distance of the gap between the cylindrical rollers can be set by a distance setting unit.

In processing rubber waste, the rubber waste is deformed by the rubber waste deformation unit provided in the casing, and ozone-containing gas is supplied into the casing from the ozone-containing gas supply unit. Accordingly, the ozone-containing gas acts on the rubber waste attaining a deformed state.

If strain is not generated at the rubber waste, decomposition of the rubber waste is effected only at the surface layer even if the ozone-containing gas acts on the rubber waste. It will be difficult to rapidly promote decomposition inwardly. In the rubber waste disposal apparatus of the present invention, ozone-containing gas is supplied from the ozone-containing gas supply unit into the casing to cause the rubber waste to react with the ozone-containing gas while the rubber waste is deformed by the rubber waste deformation unit provided in the casing. Thus, decomposition of the rubber waste is promoted extremely rapidly.

Since ozone-containing gas is supplied from the ozone-containing gas supply unit into the casing, a sealed space can be provided so that the ozone-containing gas does not escape outside the casing. The ozone-containing gas supply unit may be provided inside or outside the casing as long as it has the function to supply ozone-containing gas into the casing.

Deformation of the rubber waste is effected by a pair of cylindrical rollers having a plurality of protrusions projecting outwards, capable of sandwiching rubber waste at the gap between the cylindrical rollers. In order to facilitate rapid decomposition of the rubber waste, the ozone of high concentration must act intensively on the region of the rubber waste under load of tension. If only bending strain is applied on the rubber waste, decomposition of the rubber waste, although promoted at the stretching side, is not easily promoted at the compressed side. In the rubber waste disposal apparatus of the present invention, deformation of the rubber waste is generated by having the rubber waste sandwiched at the gap between the cylindrical rollers and having the plurality of protrusions of the pair of cylindrical rollers clamp firmly into the rubber waste. The clamp of the plurality of protrusions firmly into the rubber waste causes deformation such as stretching and compression as well as partial bending of the rubber waste. Since ozone-containing gas is supplied intensively into the casing from the ozone-containing gas supply unit onto the deformed region of the rubber composition, decomposition of the rubber waste can be effected extremely efficiently.

In the rubber waste disposal apparatus of the present invention, the distance of the gap between the cylindrical rollers can be set by the distance setting unit. Specifically, the distance of the gap between the cylindrical rollers can be set according to the size of the rubber waste. Therefore, rubber waste of various sizes can be decomposed extremely efficiently. It is not necessary to prepare in advance a plurality of pairs of cylindrical rollers with various different gap distance since the distance of the gap between the cylindrical rollers can be set corresponding to the size of the rubber waste by the distance setting unit. The processing of the rubber waste can be carried out economically. Even if the size of the rubber waste changes during the processing procedure, only the distance of the gap between the pair of cylindrical rollers has to be reset by the distance setting unit. It is not necessary to exchange the pair of cylindrical rollers. Thus, rubber waste disposal can be promoted rapidly and properly.

In the rubber waste disposal apparatus of the present invention, the distance of the gap between the cylindrical rollers is in the range of 5%–60%, preferably in the range of 10%–50% the width of the rubber waste. For example, if the rubber waste is a used tire with a tire tread width of 200 mm, the gap distance is 10 mm–120 mm, preferably 20 mm–100 mm. If the gap distance is less than 5% the width, the rubber waste cannot readily move into the gap. Also, the durability of the apparatus may be degraded since an extremely large force is applied on each roller. If the gap distance exceeds 60% the width, deformation of the rubber waste such as bending, stretching, compression and the like will not easily occur despite the entry of the rubber waste between the rollers. Accordingly, the decomposition efficiency is degraded.

The ozone-containing gas of the present embodiment includes the component of moisture in addition to ozone and air. The usage of gas including moisture promotes the decomposition rate of rubber to carry out the decomposition of the rubber waste more efficiently. Furthermore, moisture is useful in preventing fire hazards.

The rubber waste deformation unit is preferably provided with a rotational speed control unit controlling the rotational speed of the pair of cylindrical rollers. The rotational speed control unit can control the rotational speed of at least one of the cylindrical rollers. In other words, either or both of the rollers of the cylindrical roller pair can have the rotational speed controlled. By controlling the rotational speed of the pair of cylindrical rollers to adjust the rotational speed of the cylindrical roller, deformation and decomposition of rubber waste can be effected uniformly. Uniform generation of deformation of the rubber waste allows the ozone-containing gas supplied into the casing to act evenly on the deformed region to further promote decomposition of the rubber waste. As a result, the decomposition process of rubber waste can be carried out at an effective running cost. Since the rotational speed of the pair of cylindrical rollers can be controlled according to the type and aspect of the rubber waste such as the hardness, size, type of the rubber waste, an appropriate decomposition process of rubber waste can be carried out corresponding to each specific type of the rubber waste.

The rotational speed of the cylindrical roller is at least 0.1 rpm, preferably at least 1 rpm. If the rotational speed is below 0.1 rpm, the speed of deformation applied on the rubber waste is so slow that the amount of deformation per unit time is reduced, taking an extremely long period of time to decompose the entire rubber waste. It is possible to provide a rotation direction control unit to control the rotating direction of the pair of cylindrical rollers at the rubber waste deformation unit.

The provision of a rotational direction control unit allows the decomposition process of the rubber waste to be promoted by setting the rotation of the pair of cylindrical rollers in one direction. This is because it is possible to generate deformation at various regions of the rubber waste efficiently than in the case where the direction is set to the opposite direction.

Preferably, the ozone concentration of the ozone-containing gas in the present invention is preferably at least 10 wt %. If the ozone concentration is below 10 wt %, the decomposition rate of rubber is degraded to take an extremely long period of time to decompose the rubber waste entirely.

The rubber waste includes used tires, cut tires for testing, prototype tires that are to be disposed of, and the like. The present invention is particularly suitable to the decomposition process of old tires (including used tires). The present invention is not limited to these specific examples of the rubber waste, and a rubber waste disposal apparatus according to the present invention can be employed for other rubber refuse.

In the rubber waste disposal apparatus of the present invention, a rubber waste hold unit can be provided holding rubber waste and allowing insertion of rubber waste at the gap between the pair of cylindrical rollers. In the case where a rubber waste hold unit is provided, the rubber waste can be inserted into the gap between the cylindrical rollers while firmly fixing the rubber waste by the rubber waste hold unit. Therefore, the rubber waste can be inserted in the gap between the cylindrical rollers while confirming the decomposition processing state of the rubber waste. Thus, a rubber waste decomposition process can be carried out rapidly and properly.

Embodiment

FIG. 1 is a front view of a rubber waste disposal apparatus of the present invention, partially with a cross section. In the present embodiment, an old tire 6 is used as the rubber waste. Old tire 6 can be inserted into a casing 1 from above the ceiling of a casing upper portion 1a which is the upper stage portion of casing 1. A lid 14 that can be opened/closed arbitrarily is provided at the ceiling of casing upper portion 1a. In FIG. 1, lid 14 is depicted in the closed state. A pair of cylindrical rollers 2, 2 are provided at casing middle portion 1b that is the middle stage portion of casing 1. Cylindrical roller 2 has a roller body 2b of substantially a cylindrical shape fixed at a roller shaft 2c. A plurality of protrusions 2a are provided at cylindrical roller body 2b. The plurality of protrusions 2a are provided around roller body 2b at a constant interval in the circumferential direction with a predetermined angle. Roller shaft 2c is supported by roller shaft bearing 2d, 2d so that cylindrical roller 2 is rotatable.

A storage 8 is provided at a casing lower portion 1c located at the lower stage portion of casing 1. Old tire 6 is subjected to a decomposition process to become rubber comminuted pieces of approximately 1.0 mm–100 mm. These rubber comminuted pieces are stored in storage 8. Comminuted pieces of the tire composing member other than the rubber composition such as steel wire and fibers are also stored in storage 8. Two motors are provided inside casing lower portion 1c. Motor 9 drives cylindrical roller 2. In the present embodiment, two motors 9, 9 drive the pair of cylindrical rollers 2, 2, respectively. A motor rotation actuation unit 9a effecting the rotation of motor 9 is provided. A chain 10 has one end engaged with motor rotation actuation unit 9a and the other end engaged with the end portion of roller shaft 2c. Actuation of motor 9 causes rotation of roller shaft 2c via chain 10. As a result, cylindrical roller 2 rotates.

Figure 2:
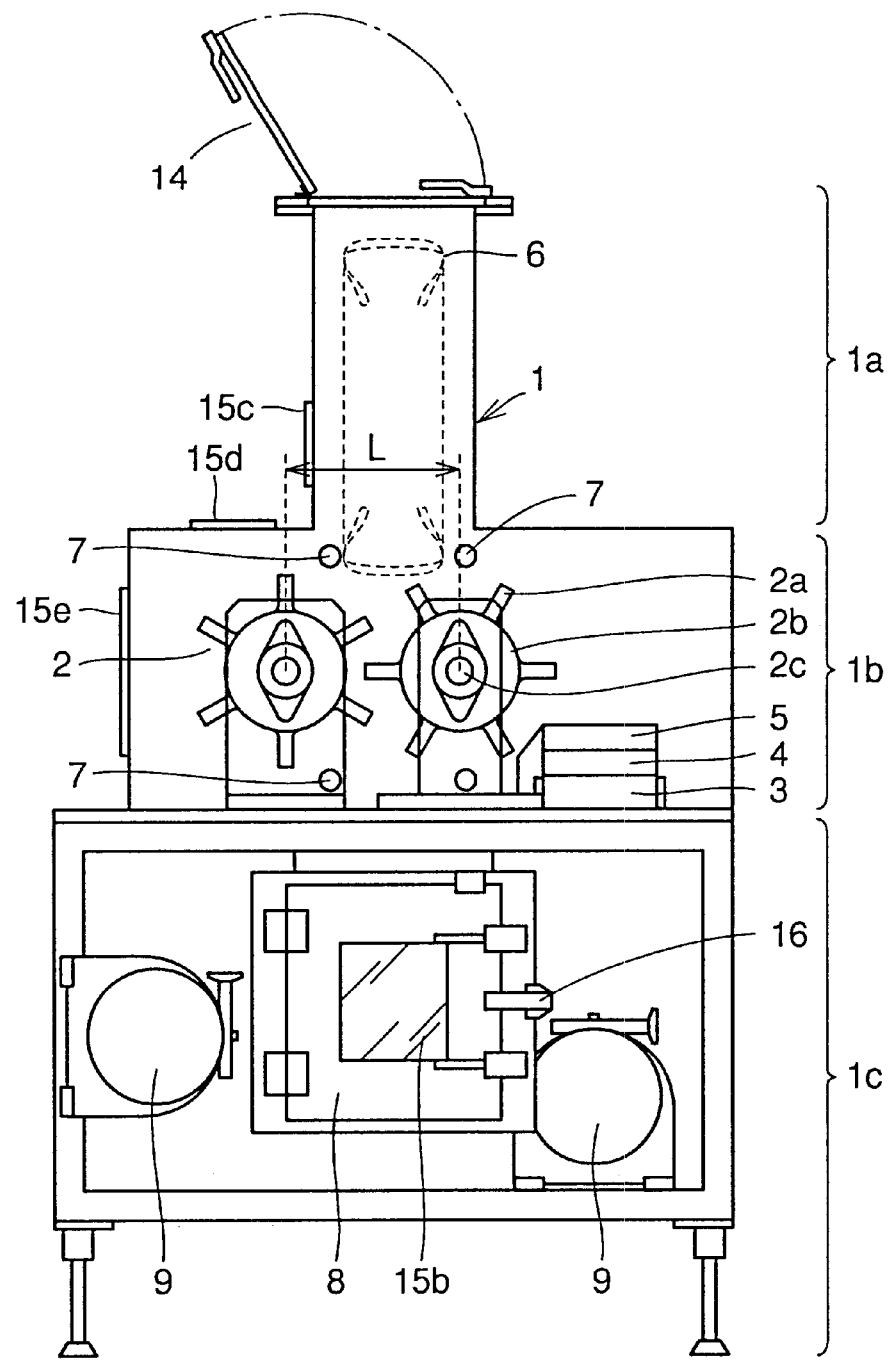
FIG. 2 is a side view of the rubber waste disposal apparatus of the present invention.

Four ozone-containing gas dispersion units 7 are provided at casing middle portion 1b. Ozone-containing gas is supplied from an ozone-containing gas generator not shown. The ozone-containing gas is spread out in the proximity of the pair of cylindrical rollers 2, 2 from ozone-containing gas dispersion unit 7. In the present embodiment, the ozone-containing gas supply unit includes an ozone-containing gas generator and an ozone-containing gas dispersion unit 7. Although four ozone-containing gas dispersion units 7 to spray out ozone-containing gas are provided in the present embodiment, the number of the dispersion units is not limited to 4. A single unit alone or more than 4 units can be provided. By supplying ozone of high concentration intensively to the region of the rubber waste sandwiched between the cylindrical rollers under the load of stress to facilitate the reaction between ozone and the rubber waste effectively, the amount of ozone consumption required to comminute rubber can be optimized. The ozone-containing gas dispersion unit can be provided at least in the vertical or horizontal direction of the pair of cylindrical rollers. In FIG. 2, ozone-containing gas dispersion units are provided in the vertical direction of each of the cylindrical rollers. The ozone-containing gas dispersion unit is formed of a pipe having a plurality of holes.

A first exhaust duct 12 is provided at casing upper portion 1a. First exhaust duct 12 is provided with a valve V1 that can open/close the channel. By opening valve V1 in spraying out ozone-containing gas from ozone-containing gas dispersion unit 7, ozone-containing gas is discharged out of casing 1 through first exhaust duct 12. An admission duct 11 is provided at casing lower portion 1c, provided with a valve V3 to open/close the channel. A second exhaust duct 13 is provided at casing 1a with a valve V2 to open/close the channel. When the decomposition process of old tire 6 is completed and the ozone-containing gas in casing 1 is to be discharged outside casing 1, outside air is introduced through admission duct 11 to discharge the ozone-containing gas together with the air outside casing 1 through second exhaust duct 13. Since ozone-containing gas gives rise to health problems and environmental problems, the gas discharged from second exhaust duct 13 is passed through an ozone-containing gas processor to be defused.

An observation window 15a is provided at casing upper portion 1a. Insertion of old tire 6 between cylindrical rollers 2, 2 can be observed through window 15a to ensure that the old tire decomposition process is carried out properly.

FIG. 2 is a side view of the rubber waste disposal apparatus of the present invention partially with a cross section. In FIG. 2, lid 14 provided at the ceiling of casing upper portion 1a is open. During the decomposition process of old tire 6, lid 14 must be closed to prevent the ozone-containing gas from escaping. A pair of cylindrical rollers 2, 2 is located at casing middle portion 1b. Cylindrical roller 2 has cylindrical roller body 2b fixed to roller shaft 2c. A plurality of protrusions 2a are provided at cylindrical roller body 2b. Four ozone-containing gas dispersion units 7 are provided to supply ozone-containing gas in the proximity of cylindrical roller 2. Old tire 6 is clamped by the plurality of protrusions 2a projecting outwards of roller body 2b, whereby old tire 6 is subjected to deformation such as stretching, compression, and the like in addition to bending. Since the ozone-containing gas supplied into the casing from the ozone-containing gas supply unit acts intensively on the deformed region of old tire 6, decomposition of old tire 6 can be carried out efficiently.

A distance setting unit 3 is provided at casing middle portion 1b to set the distance L of the gap between cylindrical rollers 2, 2. Although distance setting unit 3 is provided inside casing 1 in the present embodiment, distance setting unit 3 can be provided outside casing 1 instead. Since gap distance L between cylindrical rollers 2, 2 can be set corresponding to the size of old tire 6 by distance setting unit 3, old tires 6 of various sizes can be decomposed efficiently. The degree of old tire 6 being seized by the plurality of protrusions 2a projecting outwards from roller body 2b can be adjusted by selectively setting gap distance L. For example, when the gap distance corresponding to old tire seized appropriately by protrusion 2a of roller body 2b is L0, old tire 6 can be seized more firmly by protrusion 2a of roller body 2b by setting gap distance L slightly smaller than gap distance L0 such as to gap distance L1. As a result, the level of deformation towards old tire 6 can be increased to allow an appropriate old tire decomposition process corresponding to the aspect and configuration of old tire 6. Here, gap distance L is the distance between roller shafts 2c of the pair of cylindrical rollers 2, 2.

A rotational speed control unit 4 is provided at casing middle portion 1b. Rotational speed control unit 4 can control the rotational speed of the pair of cylindrical rollers 2. By controlling the rotational speed of cylindrical roller 2 to alter the rotational speed of roller 2, deformation can be generated at various regions of old tire 6. Since deformation of old tire 6 can be generated at various regions, the ozone-containing gas supplied into casing 1 can act on the deformed region to facilitate the decomposition of old tire 6. Rotational speed control unit 4 can be provided outside casing 1 instead of inside casing 1 as in the present embodiment.

A rotation direction control unit 5 is provided at casing lower unit 1b. Rotation direction control unit 5 can control the rotation direction of the pair of cylindrical rollers 2, 2. In the case where rotation direction control unit 5 is provided, the decomposition processing effect of old tire 6 can be facilitated by reversing the rotation of cylindrical roller 2 during the decomposition process of old tire 6. By reversing the direction of cylindrical roller 2 during the decomposition process of old tire 6, deformation of old tire 6 can be generated at various regions. Although rotation direction control unit 5 is provided inside casing 1 in the present embodiment, rotation direction control unit 5 can be provided outside casing 1 instead.

Two motors 9, 9 are provided at casing lower portion 1c. These two motors 9, 9 drive the pair of cylindrical rollers 2, 2, respectively. The actuation of motor 9 causes roller shaft 2c to rotate via chain 10. As a result, cylindrical roller 2 rotates. Chain 10 is not depicted in FIG. 2 for the sake of simplification. Storage 8 is provided at casing lower portion 1c. An observation window 15b is provided at storage 8. The amount of storage of the rubber comminuted pieces in storage 8 can be observed through window 15b. An observation window 15c is provided at casing upper portion 1a. The insertion of old tire 6 between cylindrical rollers 2, 2 can be observed through window 15c to ensure that old tire 6 is decomposed appropriately. Also, observation windows 15d and 15e are provided at casing medium portion 1b. The interior of casing 1 can be observed from above through window 15d. The interior of casing 1 can be observed from the side of casing 1 through window 15e. Through windows 15d and 15e can be observed the seizing of old tire 6 by protrusions 2a of roller body 2b as well as the decomposition process of old tire 6 by the pair of cylindrical rollers 2, 2.

Figure 3:
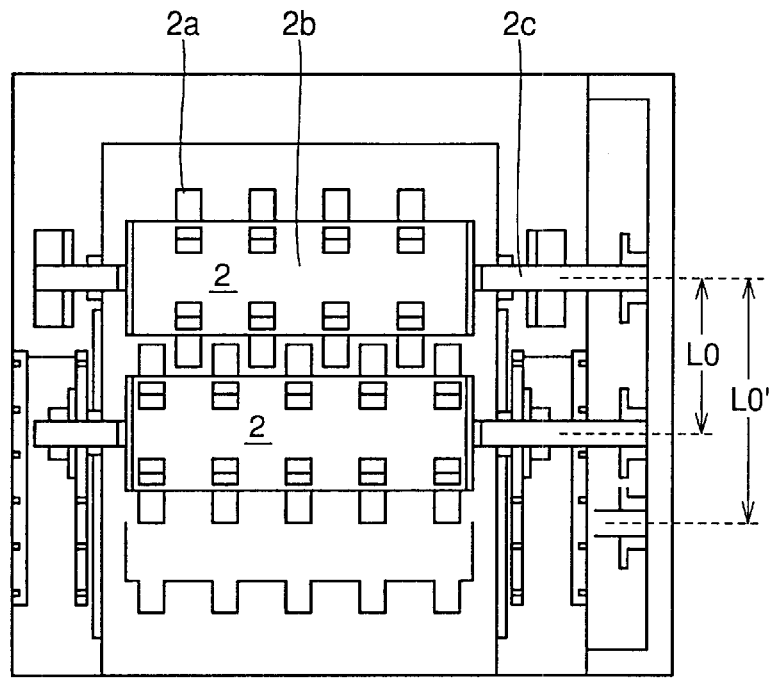
FIG. 3 is a plan view of the rubber waste disposal apparatus of the present invention.

FIG. 3 is a plan view of the rubber waste disposal apparatus of the present invention. Cylindrical roller 2 provided at casing middle portion 1b has cylindrical roller body 2b fixed to roller shaft 2c. A plurality of protrusions 2a are provided at cylindrical roller body 2b. Although the gap distance L between cylindrical rollers 2, 2 is set to L0 in FIG. 3, gap distance L can be set larger to L0' by distance setting unit 3. Distance setting unit 3 is not depicted in FIG. 3 for the sake of simplification.

Figure 4A:
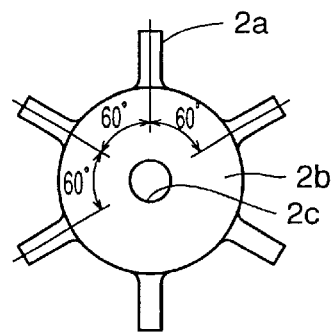
Figure 4B:
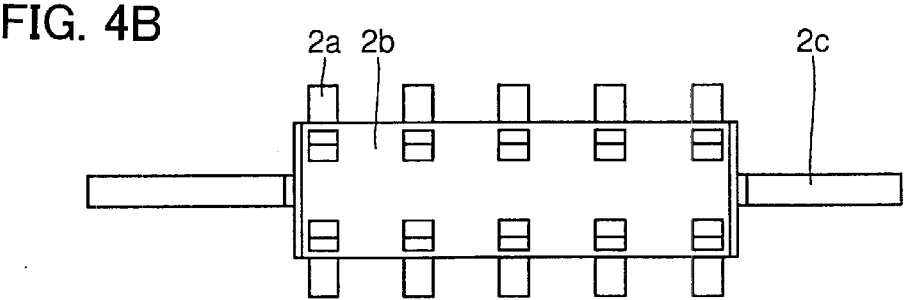
Figure 5:
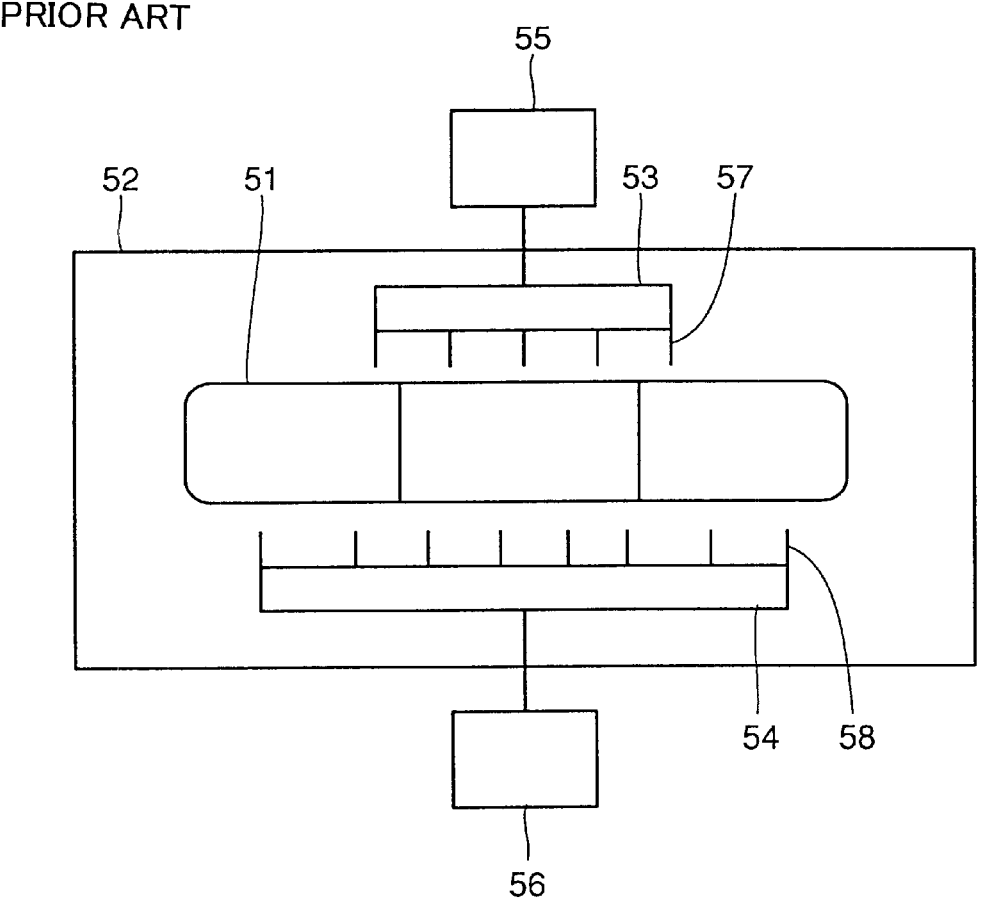
FIG. 5 is a schematic view of a conventional waste disposal apparatus.

FIG. 4A and FIG. 4B are diagrams to describe in further detail cylindrical roller 2 employed in the rubber waste disposal apparatus of the present invention. FIG. 4A corresponds to cylindrical roller 2 viewed from the axial direction of roller shaft 2c. Six protrusions 2a are provided circumferentially around roller body 2b at a constant interval of every 60°. FIG. 4B corresponds to roller 2 viewed perpendicular to the axis of roller shaft 2c. Five protrusions 2a are provided at a constant interval in the radial direction on the roller body 2b. Roller body 2b has a configuration of substantially a cylinder of 216.3 mm in diameter and 700 mm in height. Protrusion 2a has a shape of substantially a cuboid of 65 mm in height, 50 mm in longitudinal width and 24 mm in thickness. The configuration of protrusion 2a is not limited to a cuboid, and various configurations such as a conical, column, or prism configuration can be employed. Cylindrical roller 2 is formed entirely of austenitic stainless steel. Specifically, protrusions 2a, roller body 2b and roller shaft 2c are all formed of austenitic stainless steel. As austenitic stainless steel, specifically SUS 304, SUS 316L, and the like can be employed. The possibility of rust caused by ozone due to the high ozone concentration by the ozone-containing gas in casing 1 is eliminated since cylindrical roller 2 is entirely formed of austenitic stainless steel. Generation of rust can be suppressed sufficiently.

In the above embodiment, old tires (including used tires) are employed as the rubber waste. The rubber waste that can be processed by the rubber waste disposal apparatus of the present invention is not limited to old tires (including used tires), and can be used also to process defective products produced during fabrication, prototype tires, and the like.

According to the rubber waste disposal apparatus and method of treating rubber waste of the present invention, a casing, a rubber waste deformation unit, and an ozone-containing gas supply unit supplying ozone-containing gas into the casing are provided. The rubber waste deformation unit includes a pair of cylindrical rollers having a plurality of protrusions projecting outwards to seize the rubber waste at the gap therebetween. Therefore, deformation and decomposition can be effected efficiently on the rubber waste. Ozone-containing gas can be supplied to the deformed portion. Furthermore, the gap distance between the pair of cylindrical rollers can be set by a distance setting unit. Thus, rubber waste of various sizes can be subjected to decomposition efficiently.

Although the present invention has been described and illustrated in detail, it is clearly understood that the same is by way of illustration and example only and is not to be taken by way of limitation, the spirit and scope of the present invention.

What is claimed is:

1. A rubber waste disposal apparatus comprising a casing, a rubber waste deformation unit provided in said casing to subject rubber waste to deformation, and an ozone-containing gas supply unit supplying ozone-containing gas into said casing, wherein said rubber waste deformation unit includes at least a pair of cylindrical rollers having a plurality of protrusions projecting outwards, capable of sandwiching rubber waste at a gap between the cylindrical rollers, and a distance setting unit that can set a distance of the gap between said cylindrical rollers.

2. The rubber waste disposal apparatus according to claim 1, wherein the gap distance of said pair of cylindrical rollers is 5–60% a width of rubber waste.

3. The rubber waste disposal apparatus according to claim 1, wherein said ozone-containing gas is a mixture of ozone, air and moisture.

4. The rubber waste disposal apparatus according to claim 1, wherein said rubber waste deformation unit includes a rotational speed control unit controlling a rotational speed of said pair of cylindrical rollers.

5. The rubber waste disposal apparatus according to claim 1, wherein a rotational speed of said pair of cylindrical rollers is at least 0.1 rpm.

6. The rubber waste disposal apparatus according to claim 1, wherein said rubber waste deformation unit includes a rotation direction control unit controlling a rotation direction of said pair of cylindrical rollers.

7. The rubber waste disposal apparatus according to claim 1, wherein a rotation direction of said pair of cylindrical rollers is in a same direction when decomposing rubber waste.

8. The rubber waste disposal apparatus according to claim 1, wherein an ozone concentration of said ozone-containing gas is at least 10 wt %.

9. The rubber waste disposal apparatus according to claim 1, wherein said ozone-containing gas supply unit supplies ozone-containing gas of high concentration uniformly all over a region of rubber waste under load of stress between the cylindrical rollers from above and below or from left and right through a plurality of pipes having a plurality of holes, provided vertically or horizontally in close proximity to the pair of cylindrical rollers, whereby reaction with the rubber waste is readily and promptly carried out efficiently under an atmosphere of gas containing ozone of high concentration.

10. A method of treating rubber waste comprising the steps of supplying, in an ozone gas atmosphere, rubber waste into a rubber waste disposal apparatus comprising a casing and a rubber waste deformation unit, wherein the rubber waste deformation unit which includes a pair of cylindrical rollers having a plurality of protrusions projecting outwards and capable of sandwiching rubber waste at a gap between said cylindrical rollers, and adjusting a distance of the gap between said cylindrical rollers by means of a distance setting unit to decompose rubber waste effectively.

11. A method of treating rubber waste according to claim 10, wherein the gap distance of said pair of cylindrical rollers is adjusted to 5–60% a width of rubber waste.

12. A method of treating rubber waste according to claim 10, wherein said ozone gas atmosphere is a mixture of ozone, air and moisture.

13. A method of treating rubber waste according to claim 10, wherein said rubber waste deformation unit includes a rotational speed control unit which is adjusted so as to control a rotational speed of said pair of cylindrical rollers.

14. A method of treating rubber waste according to claim 13, wherein the rotational speed of said pair of cylindrical rollers is adjusted to be at least 0.1 rpm.

15. A method of treating rubber waste according to claim 10, wherein said rubber waste deformation unit includes a rotation direction control unit which is adjusted so as to control a rotation direction of said pair of cylindrical rollers.

16. A method of treating rubber waste according to claim 15, wherein the rotation direction of said pair of cylindrical rollers is adjusted to he in a same direction when decomposing rubber waste.

17. A method of treating rubber waste according to claim 12, wherein the ozone is in a concentration of at least 10 wt %.

18. A method of treating rubber waste according to claim 10, wherein the ozone gas atmosphere is supplied with an ozone-containing gas supply unit at a high concentration uniformly all over a region of rubber waste under load of stress between the cylindrical rollers from above and below and/or from left and right through a plurality of pipes having a plurality of holes, provided vertically and/or horizontally in close proximity to the pair of cylindrical rollers.

* * * * *